United States Patent
Haletky et al.

(10) Patent No.: US 10,924,481 B2
(45) Date of Patent: Feb. 16, 2021

(54) PROCESSING SYSTEM FOR PROVIDING CONSOLE ACCESS TO A CYBER RANGE VIRTUAL ENVIRONMENT

(71) Applicant: Bank of America Corporation, Charlotte, NC (US)

(72) Inventors: Edward Haletky, Austin, TX (US); Jesse Williams, Huntersville, NC (US); Saumitra Gupta, Chapel Hill, NC (US); Tommy W. Jinks, Jr., Stanley, NC (US); Kathleen D. Schaumburg, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 72 days.

(21) Appl. No.: 16/181,569

(22) Filed: Nov. 6, 2018

(65) Prior Publication Data

US 2020/0145420 A1   May 7, 2020

(51) Int. Cl.
*H04L 29/06* (2006.01)
*H04W 12/06* (2021.01)
(52) U.S. Cl.
CPC ........ *H04L 63/0884* (2013.01); *H04L 63/029* (2013.01); *H04L 63/0876* (2013.01); *H04L 63/105* (2013.01); *H04W 12/06* (2013.01)
(58) Field of Classification Search
None
See application file for complete search history.

(56) References Cited

U.S. PATENT DOCUMENTS 6,826,616 B2   11/2004 Larson et al.
6,839,759 B2   1/2005 Larson et al.
(Continued)

FOREIGN PATENT DOCUMENTS

WO   2009075656 A1   6/2009

OTHER PUBLICATIONS

Amit Chowdhry "Hysolate: This Startup Improves Enterprise Security Through the Use of a Virtual Air Gap" https://www.forbes.com/sites/amitchowdhry/2018/03/05/hysolate-this-startup-improves-enterprise-security-through-the-use-of-a-virtual-air-gap/#42dbc3ac59de Mar. 5, 2018, pp. 1-5.
(Continued)

*Primary Examiner* — Brandon S Hoffman
(74) *Attorney, Agent, or Firm* — Banner & Witcoff, Ltd.; Michael A. Springs

(57) ABSTRACT

Aspects of the disclosure relate to processing systems that implement a virtual air gap to facilitate improved techniques for establishing console access to a cyber range virtual environment. A computing platform may receive, via a first firewall, a cyber range request and authentication credentials from a secure console host platform. By comparing the authentication credentials to access records in a stored database, the computing platform may determine an authorization level corresponding to the authentication credentials. After verifying the authentication credentials, the computing platform may grant access to a broker, which may grant access to a console hosted by the secure console host platform. The computing platform may establish, using the broker and between the console and a cyber range host platform, a connection, which may cause a user device to access, through the console, cyber ranges hosted by the cyber range host platform that correspond to the determined authorization level.

20 Claims, 9 Drawing Sheets

(56) References Cited

U.S. PATENT DOCUMENTS

| | | | |
|---|---|---|---|
| 7,406,585 B2 | 7/2008 | Rose et al. | |
| 7,448,078 B2 | 11/2008 | Daenen | |
| 7,623,149 B2 | 11/2009 | Winegard | |
| 8,281,377 B1 | 10/2012 | Snow et al. | |
| 8,335,678 B2 | 12/2012 | Hughes et al. | |
| 8,335,931 B2 | 12/2012 | Lee et al. | |
| 8,413,216 B2 | 4/2013 | Hughes et al. | |
| 8,756,696 B1 | 6/2014 | Miller | |
| 8,819,822 B1 | 8/2014 | Pike et al. | |
| 8,943,201 B2 | 1/2015 | Larson et al. | |
| 8,978,102 B2 | 3/2015 | Hughes et al. | |
| 8,984,275 B2 * | 3/2015 | Ozgit | H04L 63/1425 713/154 |
| 8,985,716 B2 | 3/2015 | Lundrigan et al. | |
| 9,087,319 B2 | 7/2015 | Nguyen | |
| 9,213,859 B2 | 12/2015 | Strassmann et al. | |
| 9,300,688 B2 | 3/2016 | Morrison et al. | |
| 9,531,753 B2 | 12/2016 | Morrison et al. | |
| 9,559,842 B2 | 1/2017 | Baldwin et al. | |
| 9,614,669 B1 * | 4/2017 | Cox, Jr. | H04L 9/0869 |
| 9,680,867 B2 | 6/2017 | Hughes et al. | |
| 9,923,915 B2 | 3/2018 | Chiu et al. | |
| 10,021,126 B2 | 7/2018 | Irimie et al. | |
| 10,021,127 B2 | 7/2018 | DiValentin et al. | |
| 10,021,136 B2 | 7/2018 | Arrowood | |
| 10,028,155 B2 | 7/2018 | Pedersen et al. | |
| 10,029,181 B2 | 7/2018 | Justice et al. | |
| 10,031,804 B2 | 7/2018 | Grube et al. | |
| 10,032,011 B2 | 7/2018 | Kao | |
| 10,033,702 B2 | 7/2018 | Ford et al. | |
| 10,034,295 B2 | 7/2018 | Talukdar et al. | |
| 10,038,707 B2 | 7/2018 | Muddu et al. | |
| 10,320,828 B1 | 6/2019 | Derbeko et al. | |
| 2014/0245422 A1 | 8/2014 | Gargett | |
| 2016/0057027 A1 | 2/2016 | Hinrichs et al. | |
| 2017/0093885 A1 | 3/2017 | Houmb | |
| 2017/0163665 A1 | 6/2017 | McDougal et al. | |
| 2017/0244746 A1 | 8/2017 | Hawthorn et al. | |
| 2018/0060106 A1 | 3/2018 | Madtha et al. | |

OTHER PUBLICATIONS

Billy Cox "To Move Securely to the Cloud, Maintain a Virtual Air Gap" IT Peer Network https://itpeernetwork.intel.com/to-move-securely-to-the-cloud-maintain-a-virtual-air-gap/ Jan. 5, pp. 1-22011.
Sep. 9, 2020—U.S. Notice of Allowance—U.S. Appl. No. 16/181,608.
Guri et al. (Bridging the Air Gap between Isolated Networks and Mobile Phones in a Practical Cyber-Attack, 25 pages (year 2017), pp. 1-25.

* cited by examiner

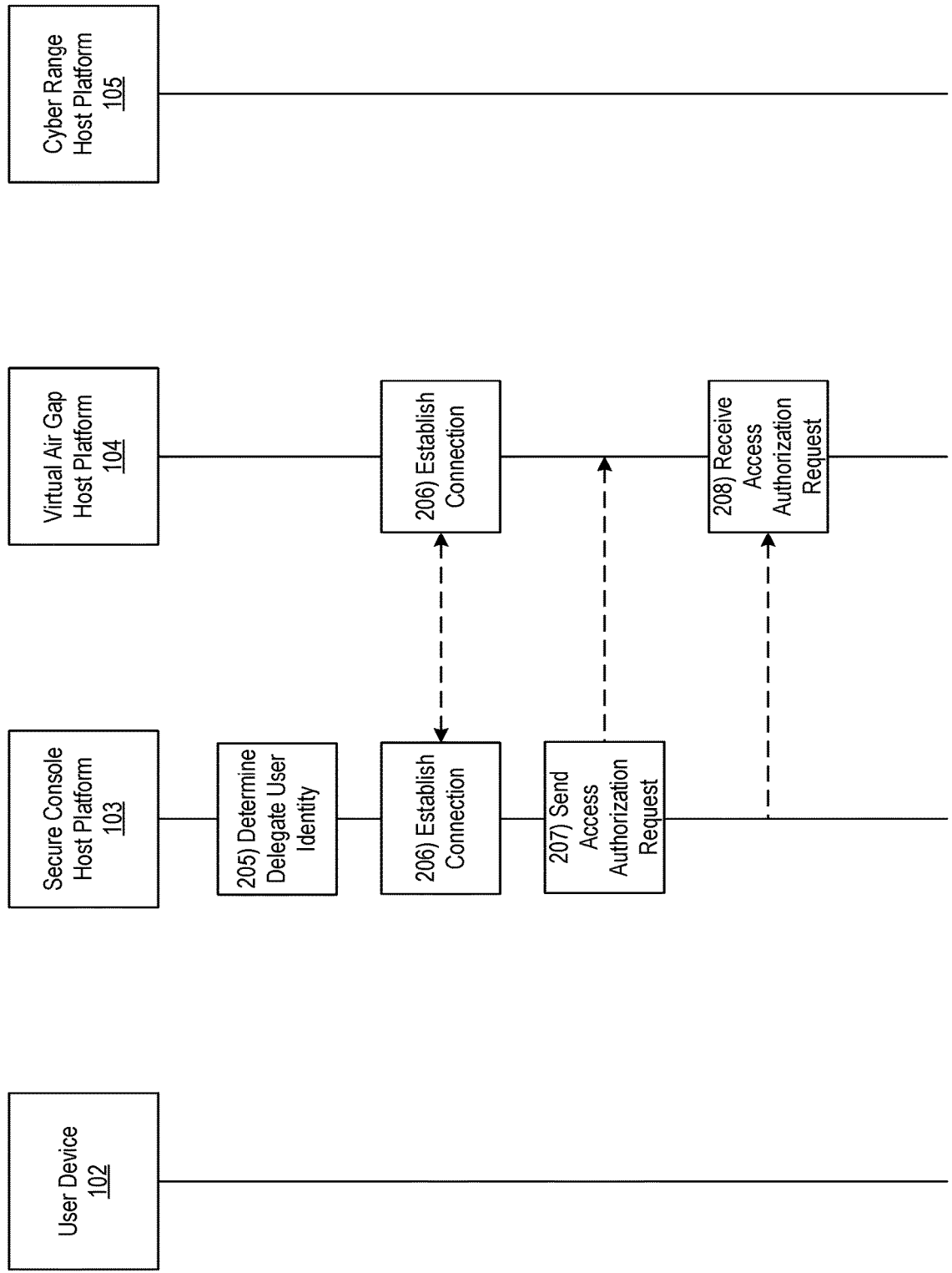

305

Cyber Range Authentication Interface

Please enter your cyber range credentials:

User Name:

Password:

Console Interface

Cyber Range Access Granted

FIG. 4

PROCESSING SYSTEM FOR PROVIDING CONSOLE ACCESS TO A CYBER RANGE VIRTUAL ENVIRONMENT

BACKGROUND

Aspects of the disclosure relate to enhanced processing systems for granting controlled console access to a cyber range virtual environment. In particular, one or more aspects of the disclosure relate to computing platforms that utilize a virtual air gap to control console access to a cyber range virtual environment. One or more aspects of the disclosure also relate to computing platforms that maintain internal network security when operating in connection with a cyber range virtual environment.

Many organizations and individuals rely on cyber range virtual environments as a means for simulating cyber-attacks and testing recovery and prevention techniques. Periodically, individuals having access to the cyber range may gain internal network access. It may be important to ensure both sufficient cyber range access while ensuring internal network security. In many instances, however, individuals with access to the cyber range may pose a threat to network security, and it may be difficult to afford them sufficient cyber range access while also ensuring utmost network security.

SUMMARY

Aspects of the disclosure provide effective, efficient, scalable, and convenient technical solutions that address and overcome the technical problems associated with controlling access to a cyber range virtual environment, while also providing effective security measures for an internal network and its associated data and other resources. For example, some aspects of the disclosure provide techniques that may enable computing platforms to selectively authenticate user devices to a cyber range virtual environment for purposes of simulating cyber-attacks and various remedial measures without endangering the security of the internal network and its associated data and other resources.

In accordance with one or more aspects of the disclosure, a system that includes a user device, a secure console host platform, a virtual air gap, and a cyber-range host platform may be provided. The cyber-range host platform may be on a physically separate network than the user device, the secure console host platform, and the virtual air gap. User authentication may occur in the virtual air gap, away from the user device and away from the cyber-range host platform. In addition, the user device and the secure console host platform may be associated with a first area, the virtual air gap may be associated with a second area, and the cyber-range host platform may be associated with a third area. The second area and the third area may be physically separate and might not be able to communicate with each other. The first area and the third area may be physically separate and might not be able to communicate with each other unless and until a broker authenticates and authorizes a connection within the virtual air gap between the secure console host platform and the cyber-range host platform. A user of the user device in the first area may authenticate in the second area to gain access to the third area. In addition, access to the broker may be granted upon verification of authentication credentials associated with the user device, and the broker may then grant access to a console hosted by the secure console host platform. In addition, the console may be located behind a firewall.

In some instances, the user authentication may occur in a no-man's-land area of the virtual air gap, away from the user device and away from the cyber-range host platform. In some instances, a display of the console may logically originate from the cyber-range host platform. In some instances, authenticating and authorizing the connection within the virtual air gap between the secure console host platform and the cyber-range host platform may include establishing, by the broker, a connection between the secure console host platform and the cyber-range host platform. In some instances, the user device might not be able to directly access the cyber-range host platform.

In accordance with an embodiment of the disclosure, a computing platform comprising at least one processor, a communication interface, and memory storing computer-readable instructions may receive, via a first firewall, a cyber range access request and authentication credentials from a secure console host platform. By comparing the authentication credentials to access records in a stored user records database, the computing platform may determine a cyber range authorization level corresponding to the authentication credentials. After verifying the authentication credentials, the computing platform may grant access to a broker, and the broker then may grant access to a console hosted by the secure console host platform. The computing platform may establish, using the broker and between the console hosted by the secure console host platform and a cyber range host platform, a connection, which may cause a user device to access, through the console, one or more cyber ranges hosted by the cyber range host platform that correspond to the determined cyber range authorization level.

In some embodiments, the computing platform may establish a data connection with the secure console host platform. In some embodiments, the authentication credentials may correspond to a delegate user identification, which may be determined by the secure console host platform based on user login information.

In some embodiments, establishing the connection between the console hosted by the secure console host platform and the cyber range host platform may cause the secure console host platform to generate information directing the user device to cause display of a user interface and to send, to the user device and via a second firewall, the information. In some embodiments, the information may be one or more of input data corresponding to the console, output data corresponding to the console, and settings corresponding to the console.

In some embodiments, establishing the connection between the console hosted by the secure console host platform and the cyber range host platform may grant access to a cyber range of the one or more cyber ranges hosted by the cyber range host platform or deny access to the cyber range of the one or more cyber ranges hosted by the cyber range host platform. In some embodiments, the computing platform may receive, from an authoritative computing device, an update to the cyber range authorization level. Based on the received update to the cyber range authorization level, the computing platform may modify the access records in the stored user records database. In some embodiments, the computing platform, the secure console host platform, and the user device may be connected to a shared network and the cyber range host platform might not be connected to the shared network.

In accordance with an embodiment of the disclosure, a system comprising a user device, a secure console host platform, a virtual air gap, and a high-security virtual environment host platform may be provided. In one or more embodiments, the high-security virtual environment host platform may be on a physically separate network than the user device, the secure console host platform, and the virtual air gap. The virtual kill switch may be associated with the virtual air gap. In response to activation of the virtual kill switch, networking functionality on a target machine may be disabled. After disabling the networking functionality on the target machine, one or more snapshots of one or more virtual machines may be captured in one or more memory or disk files. The one or more virtual machines may be disabled by the virtual kill switch.

In one or more embodiments, the virtual kill switch may be an automated kill switch that is activated in response to detection of malware. Additionally or alternatively, the virtual kill switch may be a manual kill switch that is activated in response to detection of user input. Additionally or alternatively, the virtual kill switch may operate as an additional enforcement point associated with the virtual air gap to prevent detected malware from spreading. In one or more embodiments, the high-security virtual environment host platform may be a cyber range.

In accordance with an embodiment of the disclosure, a computing platform comprising at least one processor, a communication interface, and memory storing computer-readable instructions may receive an input requesting generation of a virtual air gap to facilitate brokering of a connection between a secure console host platform and a cyber range host platform. The computing platform may generate the virtual air gap, which may include generating a built-in kill switch corresponding to the virtual air gap. The computing platform may implement the virtual air gap. The virtual air gap may be configured to receive requests to establish a connection between the secure console host platform and the cyber range host platform. The virtual air gap may also grant the secure console host platform access to a broker in response to the requests to establish the connection between the secure console host platform and the cyber range host platform. The broker may establish the connection between the secure console host platform and the cyber range host platform. In response to activation of the built-in kill switch, the computing platform may terminate the connection between the secure console host platform and the cyber range host platform.

In some embodiments, the computing platform may authenticate the secure console host platform prior to establishing, using the broker, the connection between the secure console host platform and the cyber range host platform. In some embodiments, establishing the connection between the secure console host platform and the cyber range host platform may cause initiation of a virtual data transfer between the secure console host platform and the cyber range host platform.

In some embodiments, terminating the connection between the secure console host platform and the cyber range host platform using the built-in kill switch may be in response to determining that the virtual data being transferred to the secure console host platform corresponds to malware. In some embodiments, the virtual air gap may be a portion of the computing platform.

In some embodiments, there might not be physical access between the secure console host platform and the broker. In some embodiments, the secure console host platform and the computing platform may be connected to a shared network and the cyber range host platform might not be connected to the shared network. In some embodiments, the built-in kill switch may be activated in response to a user input. In some embodiments, the built-in kill switch may be automatically activated.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for deploying an enhanced processing system that controls console access to a cyber range virtual environment in accordance with one or more example embodiments;

FIGS. 3 and 4 depict example graphical user interfaces for deploying an enhanced processing system that controls console access to a cyber range virtual environment in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

One or more aspects of the disclosure relate to a process for accessing a physically separated environment through a multi-stage virtual air gap where access may be granted from within the virtual air gap. Some aspects of the disclosure relate to layering of lockdown user areas through a limited runtime "no man's land" area to grant access to physically separated cyber range consoles that may live in the lockdown user area. In some instances, and as illustrated below, access requests may be made through a firewall to the virtual air gap.

Figure 1A:
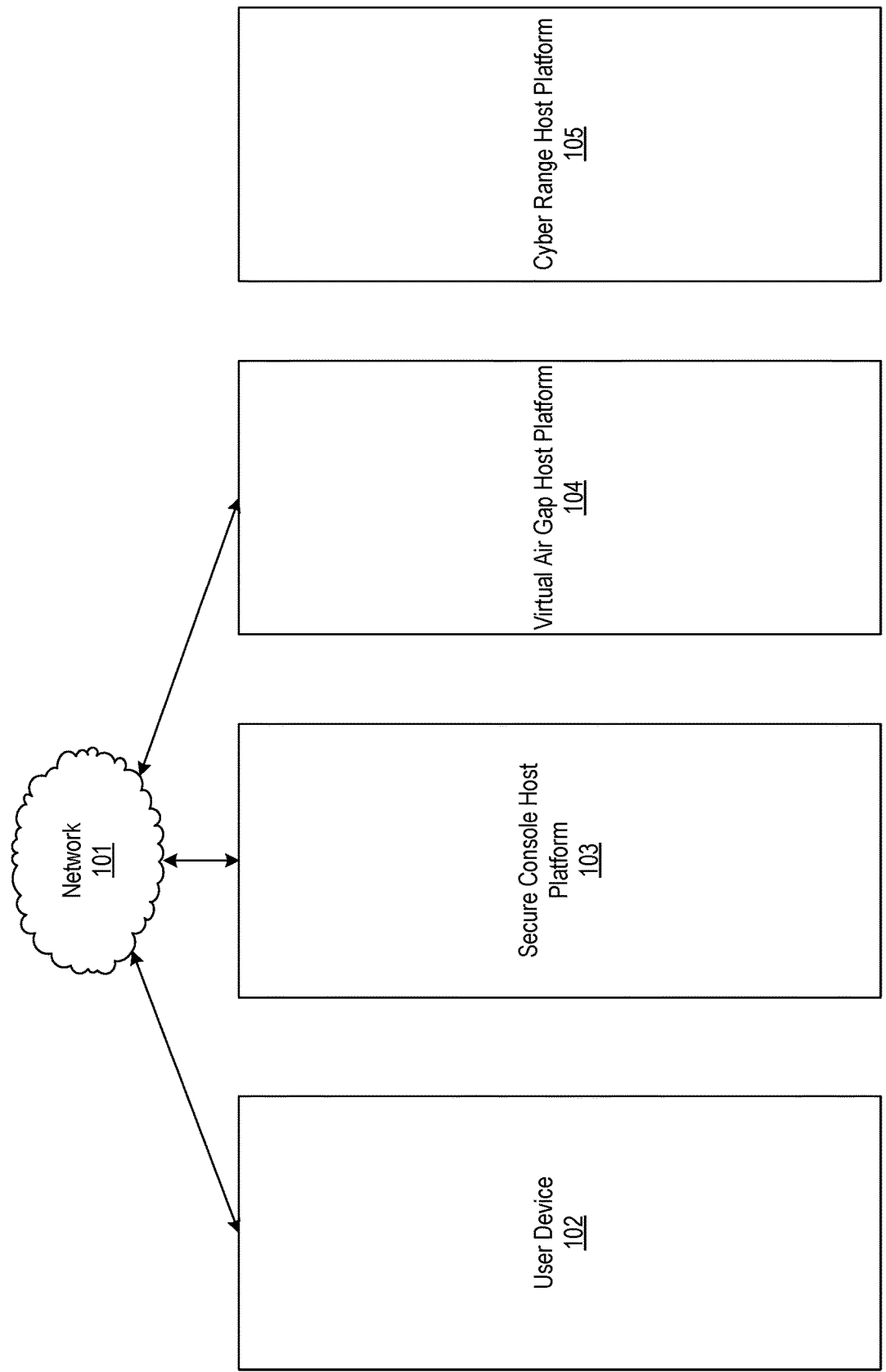
FIGS. 1A-1C depict an illustrative computing environment for deploying an enhanced processing system that controls console access to a cyber range virtual environment in accordance with one or more example embodiments.
Figure 1B:
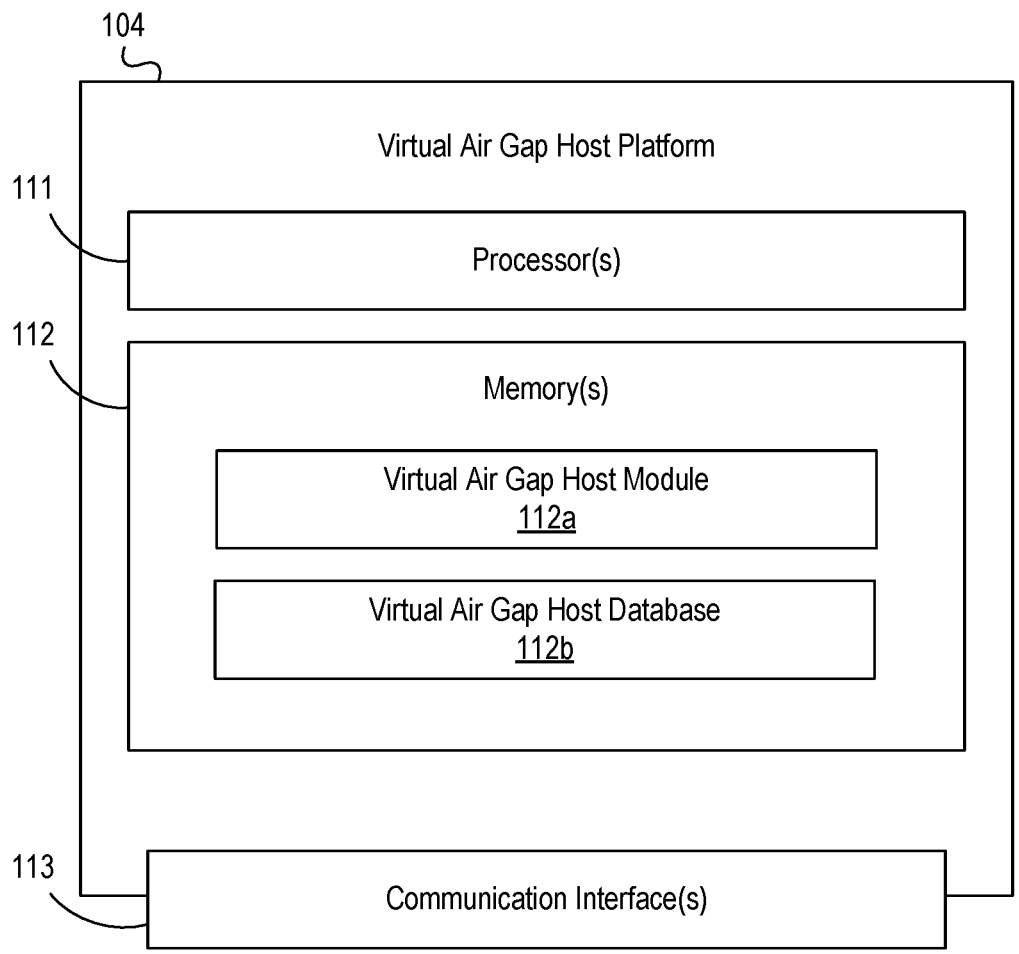
Figure 1C:
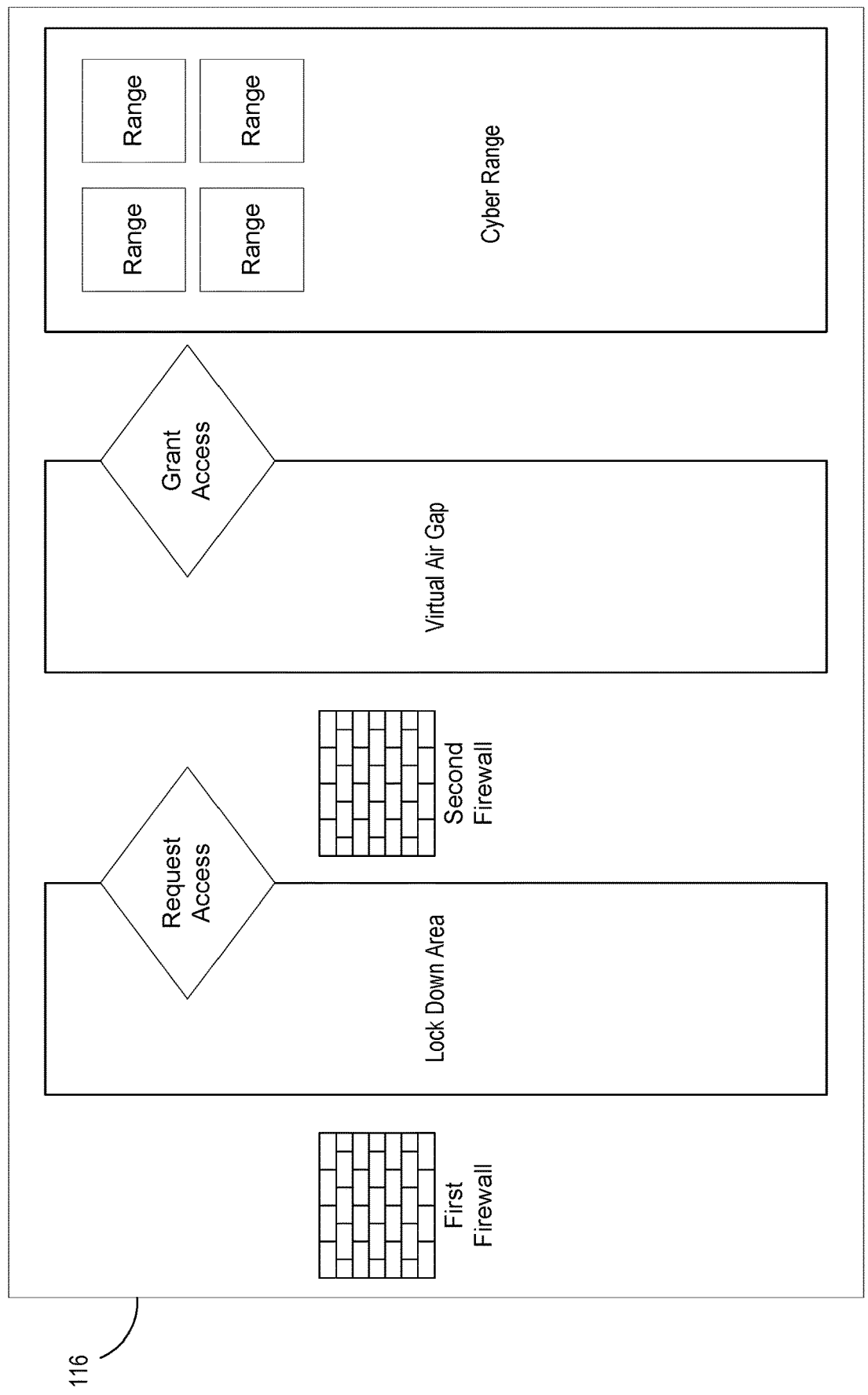

FIGS. 1A-1C depict an illustrative computing environment for deploying an enhanced processing system that controls console access to a cyber range virtual environment in accordance with one or more example embodiments. Referring to FIG. 1A, computing environment 100 may include one or more computer systems. For example, computing environment 100 may include a user device 102, a secure console host platform 103, a virtual air gap host platform 104, and a cyber range host platform 105.

User device 102 may include one or more computing devices and/or other computer components (e.g., processors, memories, communication interfaces). In addition, and as illustrated in greater detail below, user device 102 may cause display of and/or otherwise present one or more graphical user interfaces. In some instances, the graphical user interfaces presented by user device 102 may provide access to an environment associated with an organization, such as a cyber range isolation environment provided by a financial institution. Such graphical user interfaces, for instance, may provide access to an environment where cyber-attacks directed at the financial institution may be simulated. In some instances, providing the graphical user interfaces to a user device may cause display of error information (e.g., error codes, types of errors, or the like). The graphical user interfaces may also provide access to an environment where preventative and corrective measures corresponding to the cyber-attacks may be implemented. For example, the graphical user interfaces may provide employees of the financial institution with menus, controls, and/or other options to execute various resolution actions (e.g., isolate a portion of the network 101, prevent particular users from accessing the network 101, alerting an employee of the errors, freeze one or more account balances, or the like).

Secure console host platform 103 may be a computer system that includes one or more computing devices and/or other computer components (e.g., processors, memories, communication interfaces). In addition, secure console host platform 103 may be configured to receive requests (e.g., requests to access a secure cyber range environment for simulation of a cyber threat to an institution and a corresponding response, such as a cyber threat to a financial institution and the security measures taken in response, and the like.) In some instances, the secure console host platform 103 may correspond to a lock down area that hosts one or more consoles that provide, control, and/or otherwise enable access to the cyber range isolation environment while preventing access to other enterprise resources. In some instances, the secure console host platform 103 may be separated from the user device 102 by a first firewall and the virtual air gap host platform 104 by a second firewall. In some instances, the secure console host platform 103 may host one or more consoles and may correspond to a lock down area on the network 101.

In addition, and as illustrated in greater detail below, secure console host platform 103 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by secure console host platform 103 may provide access to a cyber range isolation environment for simulating cyber-attacks on the institution and various remedial and/or corrective measures taken by the institution in response. In some instances, access to the cyber range isolation environment may be limited and/or controlled based on each individual user's position, role(s), and/or function(s) (e.g., the users may include employees, agents, contractors, and/or other users who may, e.g., be designated by the organization and who may have different roles and functions) and/or may provide users of the organization (e.g., the financial institution) with menus, controls, and/or other options to execute various actions with regard to the cyber-attack simulations.

As illustrated in greater detail below, virtual air gap host platform 104 may include one or more computing devices configured to perform one or more of the functions described herein. For example, virtual air gap host platform 104 may include one or more computers (e.g., laptop computers, desktop computers, servers, server blades, or the like). In some instances, the virtual air gap host platform 104 may host one or more virtual environments, such as a virtual air gap environment, which, in some instances, may grant and/or otherwise provide access to a broker for purposes of establishing a connection and/or other access to the cyber range host platform 105.

Cyber range host platform 105 may include one or more computing devices configured to perform one or more of the functions described herein. For example, cyber range host platform 105 may include one or more computers (e.g., laptop computers, desktop computers, servers, server blades, or the like). In some instances, the cyber range host platform 105 may host one or more virtual environments, such as a cyber range isolation environment, which in some instances, may execute cyber attack simulations and responses respectively. In some instances, the cyber range host platform 105 might not be connected to the network 101. Additionally or alternatively, there might not be a network connection between the cyber range host platform 105 and any of the user device 102, the secure console host platform 103, or the virtual air gap host platform 104.

Computing environment 100 also may include one or more networks, which may interconnect user device 102, secure console host platform 103, virtual air gap host platform 104, and cyber range host platform 105. For example, computing environment 100 may include a network 101 (which may, e.g., interconnect user device 102, secure console host platform 103, and virtual air gap host platform 104). In some instances, the cyber range host platform 105 might not be connected to the network 101.

In one or more arrangements, user device 102, secure console host platform 103, virtual air gap host platform 104, cyber range host platform 105, and/or the other systems included in computing environment 100 may be any type of computing device capable of receiving a user interface, receiving input via the user interface, and communicating the received input to one or more other computing devices. For example, user device 102, secure console host platform 103, virtual air gap host platform 104, cyber range host platform 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of user device 102, secure console host platform 103, virtual air gap host platform 104, and cyber range host platform 105 may, in some instances, be special-purpose computing devices configured to perform specific functions.

Referring to FIG. 1B, virtual air gap host platform 104 may include one or more processors 111, memory 112, and communication interface 113. A data bus may interconnect processor 111, memory 112, and communication interface 113. Communication interface 113 may be a network interface configured to support communication between virtual air gap host platform 104 and one or more networks (e.g., network 101, or the like). Memory 112 may include one or more program modules having instructions that when executed by processor 111 cause virtual air gap host platform 104 to perform one or more functions described herein and/or one or more databases that may store and/or otherwise maintain information which may be used by such program modules and/or processor 111. In some instances, the one or more program modules and/or databases may be stored by and/or maintained in different memory units of virtual air gap host platform 104 and/or by different computing devices that may form and/or otherwise make up virtual air gap host platform 104. For example, memory 112 may have, host, store, and/or include a virtual air gap host module 112a and a virtual air gap host database 112b. Virtual air gap host module 112a may have instructions that direct and/or cause virtual air gap host platform 104 to execute advanced authentication techniques for establishing (e.g., by authenticating to a broker) a connection between a console hosted by the secure console host platform 103 and the cyber range host platform 105, as discussed in greater detail below. Virtual air gap host database 112b may store information that correlates user identities to cyber range authorization levels. As such, the virtual air gap host database 112b may store information used by virtual air gap host module 112a and/or virtual air gap host platform 104 in facilitating console access to the cyber range host platform 105 and/or in performing other functions.

Referring to FIG. 1C, cyber range access environment 116 may include a lock down area, a virtual air gap (e.g., "no man's land"), a cyber range, and various firewalls. A user may want to gain access to the cyber range for purposes of simulating various cyber-attacks. However, such simulations could be harmful to an internal network. To protect the internal network, a multi-stage virtual air gap may be implemented to safely grant cyber range access while protecting internal resources.

A user may send a request, through the first firewall and into the lock down area, to request access to the cyber range from a user device. The lock down area may send a request through the second firewall and into the virtual air gap for access and authentication. Once the request is authenticated at the virtual air gap, a connection may be brokered, through the second firewall, between the lock down area and one or more ranges of the cyber range. In some instances, the request may be authenticated by the virtual air gap to a broker, which may then subsequently grant access to the cyber range. This connection may allow the user to access the cyber range from their user device. In some instances, the lock down area may host a plurality of cyber ranges, managed by a range management module, and the user may gain access to one or more of the plurality of cyber ranges based on an authentication level corresponding to the user. In some instances, the authentication level may be determined at the virtual air gap and may be communicated to the cyber range and/or the lock down area. In some instances, the lock down area may host one or more consoles that may be used to facilitate cyber range access to the user device. In some instances, the lock down area may correspond to a first hardware environment, the virtual air gap may correspond to a second hardware environment (which may, e.g., be different from and/or physically separate from the first hardware environment), and the cyber range may correspond to a third hardware environment (which may, e.g., be different from and/or physically separate from the first hardware environment and the second hardware environment). In these instances, the lock down area, virtual air gap, and cyber range may each correspond to separate physical and logical environments.

In some embodiments, a system implementing one or more aspects of the disclosure may include a user device, a secure console host platform, a virtual air gap, and a cyber-range host platform. The cyber-range host platform may be on a physically separate network than the user device, the secure console host platform, and the virtual air gap. User authentication may occur in the virtual air gap, away from the user device and away from the cyber-range host platform. In addition, the user device and the secure console host platform may be associated with a first area, the virtual air gap may be associated with a second area, and the cyber-range host platform may be associated with a third area. The second area and the third area may be physically separate and might not be able to communicate with each other. The first area and the third area may be physically separate and might not be able to communicate with each other unless and until a broker authenticates and authorizes a connection within the virtual air gap between the secure console host platform and the cyber-range host platform. A user of the user device in the first area may authenticate in the second area to gain access to the third area. In addition, access to the broker may be granted upon verification of authentication credentials associated with the user device, and the broker may then grant access to a console hosted by the secure console host platform. In addition, the console may be located behind a firewall.

In some instances, the user authentication may occur in a no-man's-land area of the virtual air gap, away from the user device and away from the cyber-range host platform. In some instances, a display of the console may logically originate from the cyber-range host platform. In some instances, authenticating and authorizing the connection within the virtual air gap between the secure console host platform and the cyber-range host platform may include establishing, by the broker, a connection between the secure console host platform and the cyber-range host platform. In some instances, the user device might not be able to directly access the cyber-range host platform.

Figure 2A:
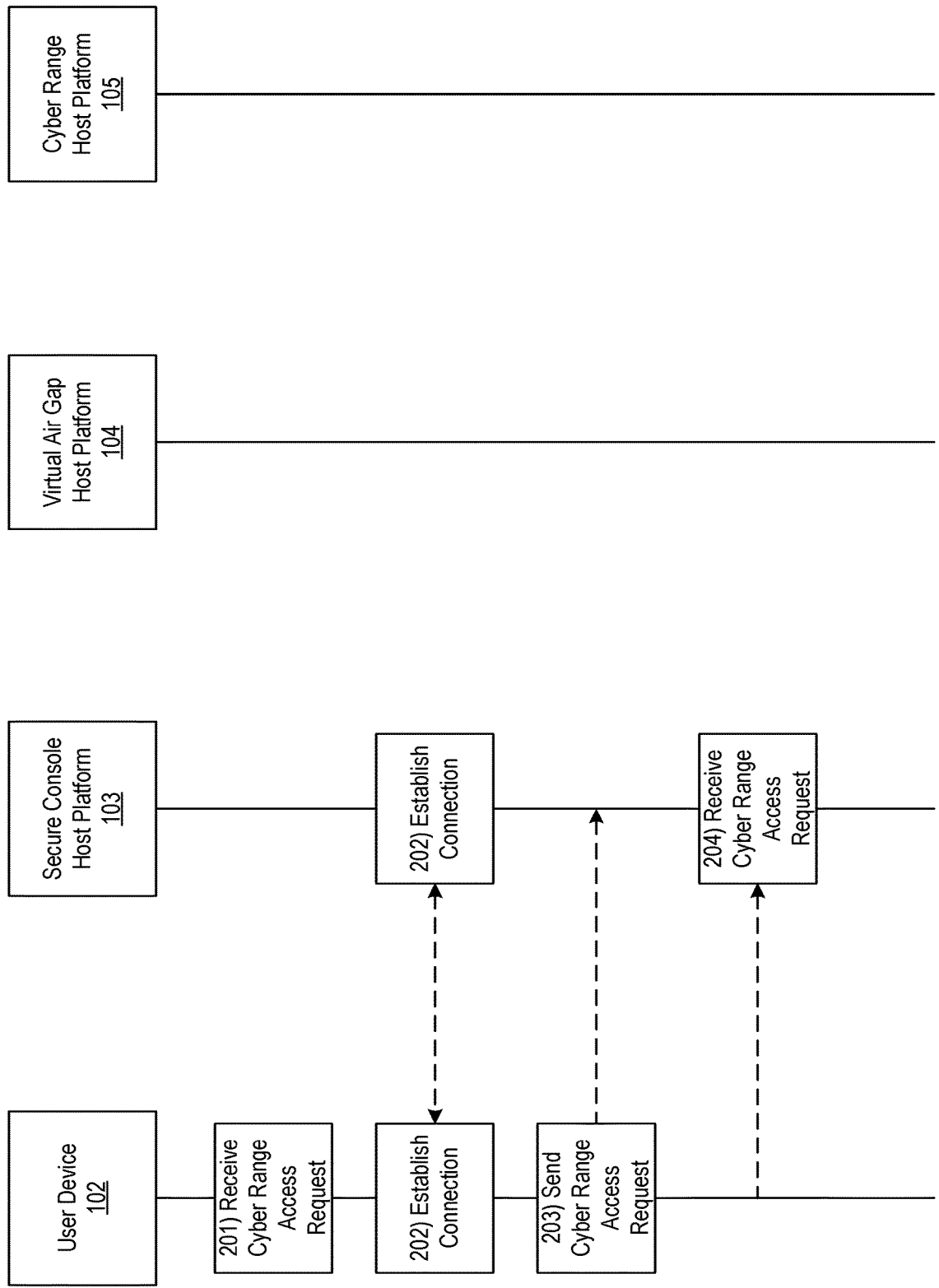

FIGS. 2A-2D depict an illustrative event sequence for deploying an enhanced processing system that controls console access to a cyber range virtual environment in accordance with one or more example embodiments. Referring to FIG. 2A, at step 201, user device 102 may receive input requesting access to a cyber range virtual environment. For example, the user device 102 may receive user input indicating that a user is requesting access to a cyber range virtual environment, such as a cyber range virtual environment hosted by cyber range host platform 105. In some instances, in receiving the cyber range access request, the user device 102 may generate and cause display of a graphical user interface similar to graphical user interface 305, which is illustrated in FIG. 3. As seen in FIG. 3, graphical user interface 305 may include a prompt for authentication credentials, such as a user name and/or password. In other instances, the user device 102 may prompt a user to select a secure token which may subsequently be used for authentication. In some instances, the user device 102 may prompt the user for authentication credentials other than those shown in FIG. 3.

At step 202, the user device 102 may establish a connection with secure console host platform 103. For example, the user device 102 may establish a first data connection with the secure console host platform 103 to link the user device 102 to the secure console host platform 103.

At step 203, the user device 102 may send the cyber range access request, received at step 201, to the secure console host platform 103. For example, the user device 102 may send, while the first data connection is established, the cyber range access request. In some instances, in sending the cyber range access request to the secure console host platform 103, the user device 102 may also send the authentication credentials received at step 201. In sending the cyber range access request and authentication credentials to the secure console host platform 103, the user device 102 may send the cyber range access request and authentication credentials through a firewall located between the user device 102 and the secure console host platform 103.

At step 204, the secure console host platform 103 may receive the cyber range access request sent by the user device 102 at step 203. In some instances, the secure console host platform 103 may receive the cyber range access request via the communication interface 113 and while the first data connection is established. In some instances, in receiving the cyber range access request, the secure console host platform 103 may also receive authentication credentials corresponding to the cyber range access request. In receiving the cyber range access request and the authentication credentials, the secure console host platform 103 may receive the cyber range access request and the authentication credentials through the firewall located between the user device 102 and the secure console host platform 103. In some instances, the secure console host platform 103 might not be configured to access a stored user records database to verify the authentication credentials received from the user device 102 and/or might not be configured to authenticate the cyber range access request.

Referring to FIG. 2B, at step 205, the secure console host platform 103 may determine a delegate user identity. For example, using the authentication credentials received at step 204, the secure console host platform 103 may determine the delegate user identity. In some instances, the secure console host platform 103 may determine the delegate user identity by translating the user identity, indicated by the authentication credentials, into the delegate user identity using a correlation database that defines relationships between actual user identity and delegate user identity. In some instances, the secure console host platform 103 may host the correlation database. In other instances, the correlation database may be a located at a remote computing device.

At step 206, the secure console host platform may establish a connection with the virtual air gap host platform 104. For example, the secure console host platform 103 may establish a second data connection with the virtual air gap host platform 104 to link the secure console host platform 103 to the virtual air gap host platform 104.

At step 207, the secure console host platform 103 may send an access authorization request to the virtual air gap host platform 104. For example, the secure console host platform 103 may generate a request to grant console access at the secure console host platform 103 to a cyber range virtual environment hosted by the cyber range host platform 105. In sending the access authorization request, the secure console host platform 103 may also send information associated with the delegate user identity determined at step 205. In some instances, the secure console host platform 103 may send the access authorization request while the second data connection is established and via the communication interface 113. In sending the access authorization request and the delegate user identity to the virtual air gap host platform 104, the secure console host platform 103 may send the access authorization request and the delegate user identity through a firewall located between the secure console host platform 103 and the virtual air gap host platform 104.

At step 208, the virtual air gap host platform 104 may receive the access authorization request and the information associated with the delegate user identity sent at step 207. For example, the virtual air gap host platform 104 may receive the access authorization request and the delegate user identity while the second data connection is established.

Figure 2C:
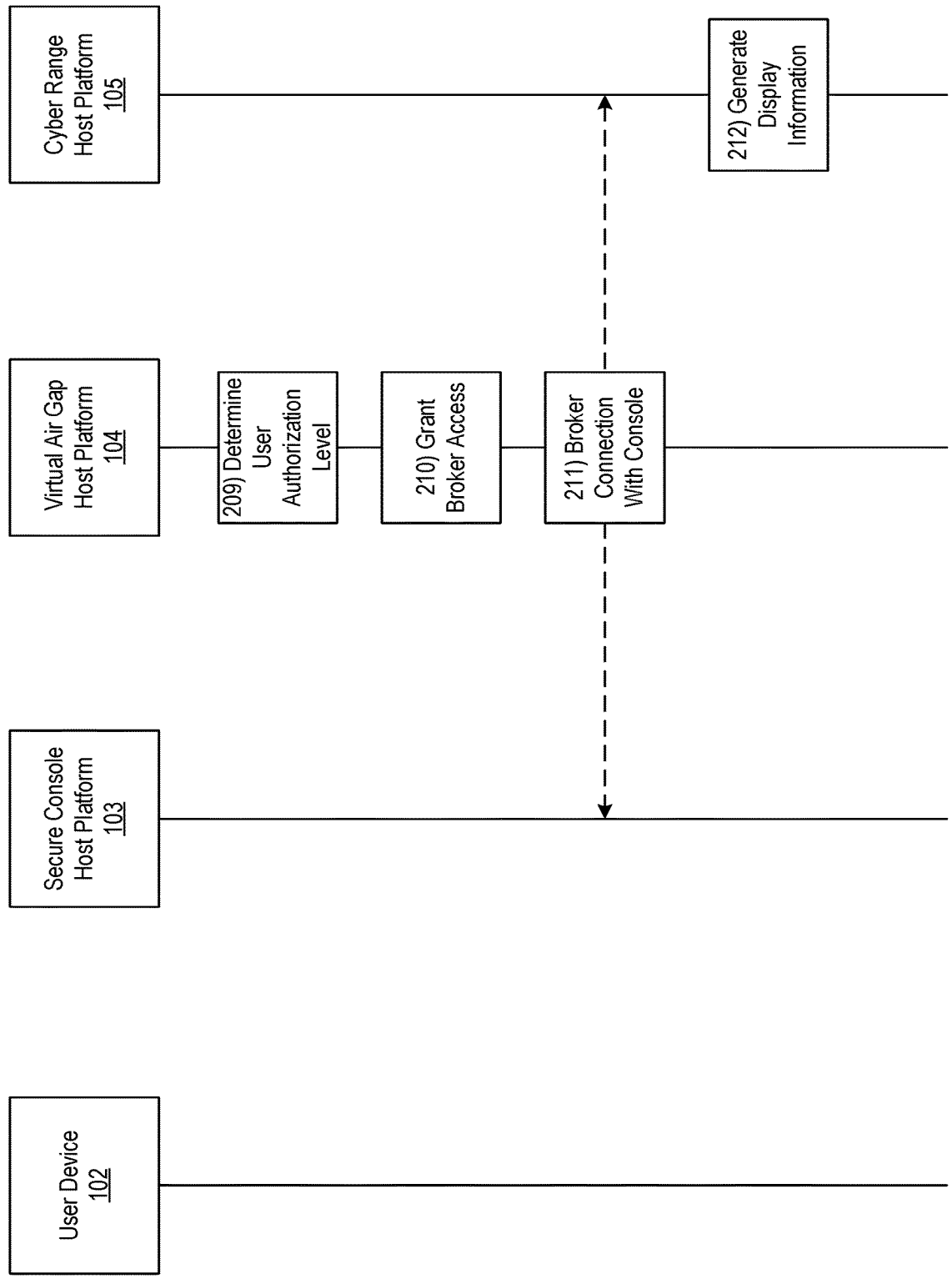

Referring to FIG. 2C, at step 209, virtual air gap host platform 104 may determine a user authorization level. For example, the virtual air gap host platform 104 may access a user records database stored at the virtual air gap host database 112b. By accessing the user records database, the virtual air gap host platform 104 may access a database of stored delegate user identities and their corresponding authorization levels. The virtual air gap host platform 104 may use the delegate user identity and the user records database to determine an authorization level for the delegate user identity received at step 208. In determining the authorization level for the delegate user identity, the virtual air gap host platform 104 may determine portions of a cyber range virtual environment, hosted at the cyber range host platform 105, to which the user should be granted access. For example, the virtual air gap host platform 104 may determine that a user should have access to a first cyber range hosted by the cyber range host platform 105 and should not have access to a second cyber range hosted by the cyber range host platform 105.

In other instances, the virtual air gap host platform 104 may access a database of stored authentication credentials and their corresponding authorizations levels. In these instances, the virtual air gap host platform 104 may use the authentication credentials and their corresponding authorization levels to determine the authorization level. In some instances, the virtual air gap host platform 104 may receive an indication from an authoritative computing device that the user records database should be updated. As a result, the virtual air gap host platform 104 may update the user records database. For example, the virtual air gap host platform 104 may determine that a particular user should have access to a second cyber range hosted by the cyber range host platform 105 in addition to a first cyber range hosted by the cyber range host platform 105, and may update the user records database accordingly.

At step 210, the virtual air gap host platform 104 may grant access to a broker that may be used to grant console access to the user device 102. For example, the virtual air gap host platform 104 may authenticate the user device 102 and/or the secure console host platform 103 to the broker, which may then grant console access to a portion of the cyber range host platform 105. In some instances, the broker may be located at the virtual air gap host platform 104. In these instances, the broker may execute (e.g., cause a connection to be established between a console and a cyber range, or the like) while operating at the virtual air gap host platform 104. In other instances, the broker might not be located at the virtual air gap host platform 104 and may be hosted by a computing device that is physically separate from the virtual air gap host platform 104.

At step 211, after access to the broker is granted, the broker may establish a connection between a console hosted by the secure console host platform 103 and one or more cyber ranges hosted by the cyber range host platform 105. In some instances, the broker may establish the connection between the console hosted by the secure console host platform 103 and one or more cyber ranges hosted by the cyber range host platform based on the authorization level determined at step 209. For example, if the authorization level indicates that the user device 102 should have console access to a first cyber range at the cyber range host platform 105 and not a second cyber range at the cyber range host platform 105, the broker may establish the connection between the console hosted by the secure console host platform 103 and the first cyber range of the cyber range host platform 105. In some instances, by establishing the connection between the console and the cyber range, the broker may allow the user to interact with a cyber range without allowing the user to access underlying elements of the cyber range host platform 105. Additionally or alternatively, by establishing the connection between the console and the cyber range, the broker may allow a user device with access to the console to interact with the cyber range (e.g., to simulate cyber-attacks, to attempt various resolution and mitigation methods in response to the simulated attacks, or the like). In some instances, the broker may establish a connection between a console hosted by a network and a cyber range that is not hosted by the network. In some instances, the cyber range host platform 105 may be physically separate from the virtual air gap host platform 104, the secure console host platform 103, and the user device 102. Additionally or alternatively, the cyber range host platform 105 may be isolated from the verification of the authentication credentials and methods performed by the broker. Additionally or alternatively, the cyber range host platform 105 might not be configured to received a user input.

At step 212, the cyber range host platform 105 may generate information directing the user device 102 to cause display of a console user interface enabling access to the one or more ranges hosted by the cyber range host platform 105 for which the console connection was brokered at step 211. In some instances, in generating the information directing the user device 102 to cause display of the console user interface, the cyber range host platform 105 may generate input data, output data, settings corresponding to the console, or the like.

Figure 2D:
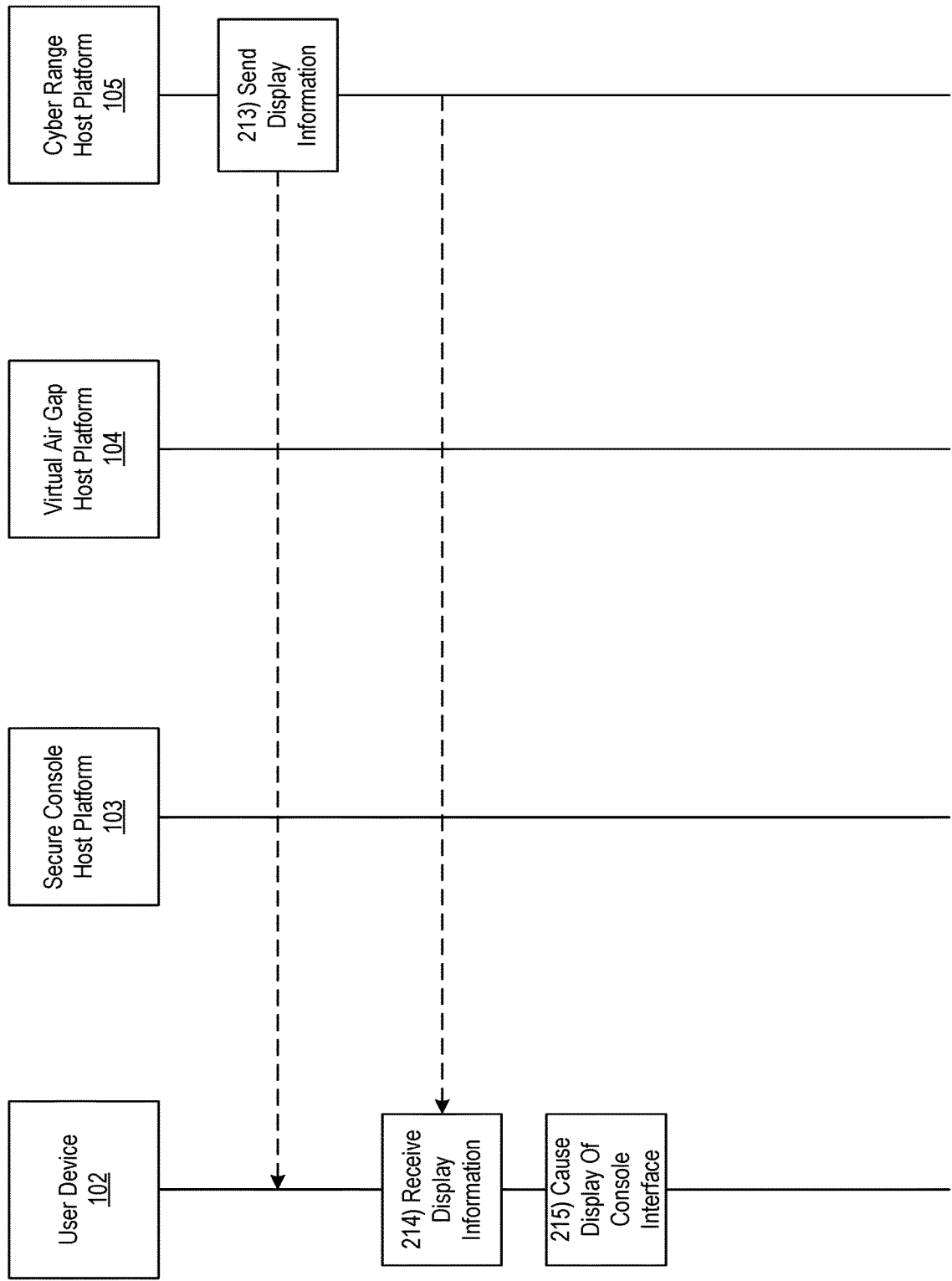

Referring to FIG. 2D, at step 213, the cyber range host platform 105 may send the information directing the user device 102 to cause display of the console user interface. For example, the cyber range host platform 105 may send the display information via the communication interface 113 and while the brokered connection is established. In sending the information directing the user device 102 to cause display of the console user interface, the cyber range host platform 105 may send the display information through the firewall located between the user device 102 and the secure console host platform 103.

At step 214, the user device 102 may receive the information directing the user device 102 to cause display of the console user interface. For example, the user device 102 may receive the information directing the user device 102 to cause display of the console user interface while the brokered connection is established. In receiving the information directing the user device 102 to cause display of the console user interface, the user device 102 may receive, through the firewall located between the user device 102 and the secure console host platform 103, the display information.

At step 215, the user device 102 may cause display of the console user interface. In some instances, in causing display of the console user interface, the user device 102 may generate and cause display of a graphical user interface similar to graphical user interface 405, which is illustrated in FIG. 4. As seen in FIG. 4, graphical user interface 405 may indicate that access to the cyber range virtual environment has been granted. In other instances, the user device 102 may prompt a user to provide input via the console user interface that may cause the simulation of one or more cyber-attacks in a cyber range hosted by the cyber range host platform 105. For example, the user device 102 may prompt the user to input one or more textual commands. In yet other instances, the user device 102 may prompt the user to provide input via the console user interface that may cause simulation of one or more techniques used to mitigate or resolve a particular cyber-attack at a cyber range hosted by the cyber range host platform 105.

Subsequently, the event sequence may end, and the user device 102 may have console access to the one or more cyber ranges hosted by the cyber range host platform 105. In causing the connection with the secure console host platform 103 to be brokered, the virtual air gap host platform 104 may enable a user of the user device to use the cyber range for simulation and testing of cyber-attacks without allowing the user to access protected internal data. By causing the connection to the virtual air gap host platform 104 to be established through the described arrangement of firewalls and by using a broker to establish a connection between a networked console and a cyber range that is not hosted on the network, the virtual air gap host platform 104 may increase the security associated with cyber range access on a secure network, while continuing to facilitate testing and research associated with preventing harmful cyber-attacks through cyber range simulations.

Figure 5:
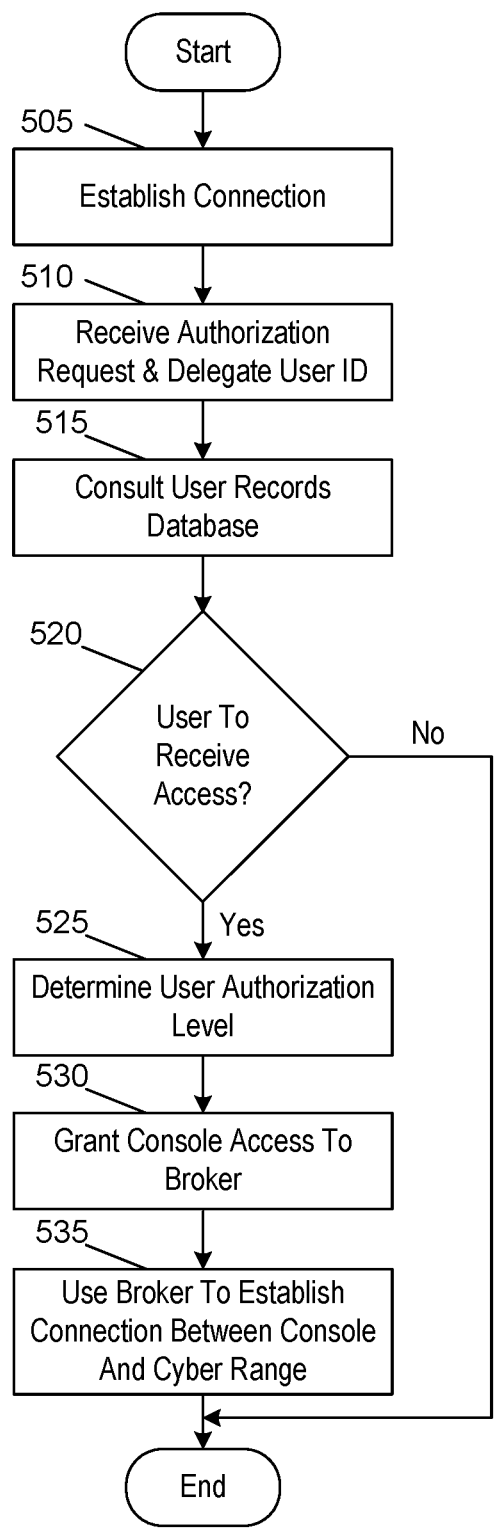
FIG. 5 depicts an illustrative method for deploying an enhanced processing system that controls console access to a cyber range virtual environment in accordance with one or more example embodiments.

FIG. 5 depicts an illustrative method for deploying an enhanced processing system that controls console access to a cyber range virtual environment in accordance with one or more example embodiments. Referring to FIG. 5, at step 505, a computing platform having at least one processor, a communication interface, and memory may establish a data connection with a secure console host platform. At step 510, the computing platform may receive, while the data connection is established, an access authorization request and a delegate user identity from the secure console host platform. At step 515, the computing platform may consult a user records database to determine an authorization level corresponding to the delegate user identity. At step 520, the computing platform may determine whether the user should receive access to the cyber range virtual environment by determining whether the delegate user identity is included in the user records database. If the computing platform determines that the delegate user identity is not included in the user records database, the method may end. If the computing platform determines that the delegate user identity is included in the user records database, the computing platform may proceed to step 525.

At step 525, the computing platform may determine an authorization level corresponding to the delegate user identity. At step 530, the computing platform may grant access to a broker, which may subsequently grant the user console access at the secure console host platform 103. At step 535, the computing platform may use and/or cause the broker to establish a connection between a portion of the cyber range virtual environment based on the authorization level determined at step 525 and the console to which access was granted at step 530.

One or more aspects of the disclosure also relate to generation of a virtual air gap that may include an intrinsic kill switch. In some instances, this virtual air gap may be hosted by the virtual air gap host platform 104 described above. In some instances, the user device 102, the secure console host platform 103, and the virtual air gap host platform 104 may be connected using a shared network, such as the network 101. In these instances, the cyber range host platform 105 might not be connected to the network 101. Accordingly, the virtual air gap host platform 104 may grant access to a broker for purposes of establishing a connection between the secure console host platform 103 and the cyber range host platform 105. The broker may cause the connection between the secure console host platform 103 and the cyber range host platform 105 to be established. As a result, there might not be physical access between a workload environment (e.g., user device 102, the secure console host platform 103) and the location of the authentication and authorization (e.g., the virtual air gap host platform 104 and the broker). Regardless, the broker may grant access from the secure console host platform 103 to the cyber range host platform 105. In some instances, data may transfer virtually over the connection established between the secure console host platform 103 and the cyber range host platform 105.

The virtual air gap host platform 104 may generate the virtual air gap in response to receiving an input requesting generation of a virtual air gap to facilitate brokering of a connection between the secure console host platform 103 and the cyber range host platform 105. In generating the virtual air gap, the virtual air gap host platform 104 may generate a built-in kill switch that may be used to terminate a connection between the secure console host platform 103 and the cyber range host platform 105. After generating the virtual air gap, the virtual air gap host platform 104 may implement the virtual air gap. In some instances, the virtual air gap may be configured to receive requests to establish a connection between the secure console host platform 103 and the cyber range host platform 105. Additionally or alternatively, the virtual air gap may be configured to grant the secure console host platform 103 access to a broker in response to the requests to establish the connection between the secure console host platform 103 and the cyber range host platform 105. After the secure console host platform 103 is granted access to the broker, the broker may establish the connection between the secure console host platform 103 and the cyber range host platform 105. In some instances, prior to establishing the connection between the secure console host platform 103 and the cyber range host platform 105, the virtual air gap host platform 104 may authenticate the secure console host platform 103. The connection between the secure console host platform 103 and the cyber range host platform 105 may remain established until the connection is terminated by the virtual air gap host platform 104 in response to activation of the built-in kill switch. While the connection between the secure console host platform 103 and the cyber range host platform 105 is established, the secure console host platform 103 and the cyber range host platform 105 may exchange virtual data corresponding to a cyber range hosted by the cyber range host platform 105.

In some instances, the virtual air gap host platform 104 may correspond to both a physical air gap and a virtual air gap. In these instances, the virtual air gap may be a portion of the physical air gap and may include a built-in kill switch to protect the workload environment. In some instances, the built-in kill switch may terminate the connection established between the secure console host platform 103 and the cyber range host platform 105. In these instances, the built-in kill switch may terminate the connection automatically or in response to a user input. In some instances, in automatically terminating the connection, the built-in kill switch may activate after expiration of a predetermined period of time. In some instances, the predetermined period of time may be configured by an administrator of the cyber range host platform 105. Additionally or alternatively, the period of time may depend on a portion of the cyber range host platform 105 to which the connection is established. In some instances, the built in kill switch may automatically activate in response to determining that the data being virtually transmitted to the secure console host platform 103 corresponds to malware. Additionally or alternatively, the determination that the data being virtually transmitted corresponds to malware may be made by a user, such as an administrator of the secure console host platform 104 or the cyber range host platform 105. In these instances, the built-in kill switch may be manually activated (e.g., via a user interface displayed on a display of a computing platform connected to the virtual air gap host platform 104 and accessible by the administrator). For example, if and/or when the virtual air gap host platform 104 detects and/or otherwise determines that one or more communications across the connection established between the secure console host platform 103 and the cyber range host platform 105 contains malware and/or other pre-restricted content, the virtual air gap host platform 104 may activate the built-in kill switch so as to immediately halt the one or more communications and/or terminate the connection so as to prevent the malware and/or other pre-restricted content from reaching the secure console host platform 103. In some instances, the built-in kill switch may cause a first portion of the connection between the secure console host platform 103 and the cyber range host platform 105 to be terminated, but may allow a second portion of the connection between the secure console host platform 103 and the cyber range host platform 105 to be maintained.

In some instances, a system comprising a user device, a secure console host platform, a virtual air gap, and a high-security virtual environment host platform may be provided. In one or more embodiments, the high-security virtual environment host platform may be on a physically separate network than the user device, the secure console host platform, and the virtual air gap. The virtual kill switch may be associated with the virtual air gap. In response to activation of the virtual kill switch, networking functionality on a target machine may be disabled. After disabling the networking functionality on the target machine, one or more snapshots of one or more virtual machines may be captured in one or more memory or disk files. The one or more virtual machines may be disabled by the virtual kill switch.

In one or more instances, the virtual kill switch may be an automated kill switch that is activated in response to detection of malware. Additionally or alternatively, the virtual kill switch may be a manual kill switch that is activated in response to detection of user input. Additionally or alternatively, the virtual kill switch may operate as an additional enforcement point associated with the virtual air gap to prevent detected malware from spreading. In one or more embodiments, the high-security virtual environment host platform may be a cyber range.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
a user device;
a secure console host platform;
a virtual air gap; and
a cyber-range host platform,
wherein:
the cyber-range host platform is on a physically separate network than the user device, the secure console host platform, and the virtual air gap;
the cyber-range host platform is configured to host one or more simulated cyber attacks;
user authentication occurs in the virtual air gap, away from the user device and away from the cyber-range host platform;
the user device and the secure console host platform are associated with a first area, the virtual air gap is associated with a second area, and the cyber-range host platform is associated with a third area;
the second area and the third area are physically separate and cannot communicate with each other;
the first area and the third area are physically separate and cannot communicate with each other unless and until a broker authenticates and authorizes a connection within the virtual air gap between the secure console host platform and the cyber-range host platform;
a user of the user device in the first area authenticates in the second area to gain access to the third area; and
access to the broker is granted upon verification of authentication credentials associated with the user device, and the broker then grants access to a console hosted by the secure console host platform and located behind a firewall, wherein the user device is configured to prompt for user input that causes simulation of a cyber attack mitigation procedure at the cyber-range host platform after the access to the broker is granted.

2. The system of claim 1, wherein the user authentication occurs in a no-man's-land area of the virtual air gap, away from the user device and away from the cyber-range host platform.

3. The system of claim 1, wherein a display of the console logically originates from the cyber-range host platform.

4. The system of claim 1, wherein authenticating and authorizing the connection within the virtual air gap between the secure console host platform and the cyber-range host platform comprises establishing, by the broker, a connection between the secure console host platform and the cyber-range host platform.

5. The system of claim 1, wherein the user device is an internal enterprise computing device and cannot directly access the cyber-range host platform.

6. A virtual air gap host platform comprising:
at least one processor;
a communication interface communicatively coupled to the at least one processor; and
memory storing computer-readable instructions that, when executed by the at least one processor, cause the virtual air gap host platform to:
receive, via a first firewall, a cyber range access request and authentication credentials from a user device, wherein a secure console host platform is unable to access a stored user records database to verify the authentication credentials and is unable to authenticate the cyber range access request;
determine, by comparing the authentication credentials to access records in the stored user records database, a cyber range authorization level corresponding to the authentication credentials; and
grant, after verifying the authentication credentials, access to a broker that grants access to a console hosted by the secure console host platform, wherein the broker establishes, between the console hosted by the secure console host platform and a cyber range host platform, a connection that causes the user device to access, through the console, one or more cyber ranges hosted by the cyber range host platform that correspond to the determined cyber range authorization level, wherein:
the cyber range host platform is physically separated from the virtual air gap host platform, the secure console host platform, and the user device, the cyber range host platform is isolated from the verification of the authentication credentials and the broker, the cyber range host platform is configured to host one or more simulated cyber attacks, and the user device is configured to prompt for user input that causes simulation of a cyber attack mitigation procedure at the cyber range host platform after the access to the broker is granted.

7. The virtual air gap host platform of claim 6, wherein the memory stores additional computer-readable instructions that, when executed by the at least one processor, further cause the virtual air gap host platform to establish a data connection with the secure console host platform.

8. The virtual air gap host platform of claim 6, wherein the authentication credentials correspond to a delegate user identification, wherein the delegate user identification was determined by the secure console host platform based on user login information.

9. The virtual air gap host platform of claim 6, wherein establishing the connection between the console hosted by the secure console host platform and the cyber range host platform further causes the secure console host platform to:

generate information directing the user device to cause display of a user interface; and send, to the user device and via a second firewall, the information.

10. The virtual air gap host platform of claim 9, wherein the information is one or more of input data corresponding to the console, output data corresponding to the console, and settings corresponding to the console.

11. The virtual air gap host platform of claim 6, wherein establishing the connection between the console hosted by the secure console host platform and the cyber range host platform comprises:

granting access to a cyber range of the one or more cyber ranges hosted by the cyber range host platform or denying access to the cyber range of the one or more cyber ranges hosted by the cyber range host platform.

12. The virtual air gap host platform of claim 6, wherein the memory stores additional computer-readable instructions that, when executed by the at least one processor, cause the virtual air gap host platform to:

receive, from an authoritative computing device, an update to the cyber range authorization level; and modify, based on the received update to the cyber range authorization level, the access records in the stored user records database.

13. The virtual air gap host platform of claim 6, wherein the virtual air gap host platform, the secure console host platform, and the user device are connected to a shared network and wherein the cyber range host platform is not connected to the shared network.

14. A method comprising:

at a virtual air gap host platform comprising at least one processor, a communication interface, and memory:

receiving, via a first firewall, a cyber range access request and authentication credentials from a user device, wherein a secure console host platform is unable to access a stored user records database to verify the authentication credentials and is unable to authenticate the cyber range access request;

determining, by comparing the authentication credentials to access records in the stored user records database, a cyber range authorization level corresponding to the authentication credentials; and granting, after verifying the authentication credentials, access to a broker that grants access to a console hosted by the secure console host platform, wherein the broker establishes, between the console hosted by the secure console host platform and a cyber range host platform, a connection that causes the user device to access, through the console, one or more cyber ranges hosted by the cyber range host platform that correspond to the determined cyber range authorization level, wherein:

the cyber range host platform is physically separated from the virtual air gap host platform, the secure console host platform, and the user device, the cyber range host platform is isolated from the verification of the authentication credentials and the broker, the cyber range host platform is configured to host one or more simulated cyber attacks, and the user device is configured to prompt for user input that causes simulation of a cyber attack mitigation procedure at the cyber range host platform after the access to the broker is granted.

15. The method of claim 14, further comprising establishing a data connection with the secure console host platform.

16. The method of claim 14, wherein the authentication credentials correspond to a delegate user identification, wherein the delegate user identification was determined by the secure console host platform based on user login information.

17. The method of claim 14, wherein establishing the connection between the console hosted by the secure console host platform and the cyber range host platform further causes the secure console host platform to:

generate information directing the user device to cause display of a user interface; and send, to the user device and via a second firewall, the information.

18. The method of claim 17, wherein the information is one or more of input data corresponding to the console, output data corresponding to the console, and settings corresponding to the console.

19. The method of claim 14, wherein establishing the connection between the console hosted by the secure console host platform and the cyber range host platform comprises:

granting access to a cyber range of the one or more cyber ranges hosted by the cyber range host platform or denying access to the cyber range of the one or more cyber ranges hosted by the cyber range host platform.

20. The method of claim 14, further comprising:

receiving, from an authoritative computing device, an update to the cyber range authorization level; and modifying, based on the received update to the cyber range authorization level, the access records in the stored user records database.

* * * * *